(12) United States Patent
Yassin

(10) Patent No.: US 11,340,952 B2
(45) Date of Patent: May 24, 2022

(54) FUNCTION PERFORMANCE TRIGGER

(71) Applicant: Microsoft Technology Licensing, LLC, Redmond, WA (US)

(72) Inventor: Hesham Yassin, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 16/680,074

(22) Filed: Nov. 11, 2019

(65) Prior Publication Data
US 2021/0141670 A1     May 13, 2021

(51) Int. Cl.
G06F 9/50     (2006.01)
G06F 9/455    (2018.01)

(52) U.S. Cl.
CPC .......... G06F 9/505 (2013.01); G06F 9/45558 (2013.01); G06F 9/5072 (2013.01); *G06F 2009/4557* (2013.01)

(58) Field of Classification Search
CPC ...................................................... G06F 9/505
See application file for complete search history.

(56) References Cited

U.S. PATENT DOCUMENTS

| 2011/0093857 | A1* | 4/2011 | Sydow | G06F 9/3851 |
| | | | | 718/102 |
| 2016/0103717 | A1 | 4/2016 | Dettori et al. | |
| 2018/0329692 | A1 | 11/2018 | Kimura et al. | |
| 2018/0336027 | A1* | 11/2018 | Narayanan | G06F 8/60 |
| 2019/0163451 | A1 | 5/2019 | Essenmacher et al. | |

OTHER PUBLICATIONS

"International Search Report and Written Opinion Issued in PCT Application No. PCT/US20/057273", dated Feb. 8, 2021, 10 Pages.

* cited by examiner

*Primary Examiner* — Charlie Sun
(74) *Attorney, Agent, or Firm* — Dicke, Billig & Czaja, PLLC

(57) ABSTRACT

A function performance trigger for a cloud computing system is disclosed. A function is to be run in response to the trigger. A template for a function in the cloud computing system is generated. The trigger is defined for the function based upon a performance parameter of the cloud computing system.

19 Claims, 3 Drawing Sheets

FUNCTION PERFORMANCE TRIGGER

BACKGROUND

Cloud computing is a model of service delivery for enabling convenient, on-demand network access to a shared pool of configurable computing resources that can be rapidly generated and released with nominal management effort or interaction with a provider of the service. Cloud computing allows a cloud consumer to obtain computing resources, such as networks, network bandwidth, servers, processing memory, storage, applications, virtual machines, and services as a service on an elastic and sometimes impermanent basis. Cloud computing platforms and infrastructures allow developers to build, deploy, and manage assets and resources for applications.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

In a scalable computing environment, such as a cloud computing system, high performance loads that strain the infrastructure are typically alleviated through the creation of additional instances in a cloud computing application. Often, the creation of additional instances can lead to further performance degradation of the application.

Cloud computing systems in a function-as-a-service allow developers to deploy cloud applications by functions. The functions are run in response to a trigger. A trigger based on a performance parameter is disclosed. For example, a template for a function in the cloud computing system is generated. The template can receive a user-defined code that provides a function. In one example, the code can provide for inputs and outputs of the function. The trigger is defined for the function based upon a performance parameter of the cloud computing system. For example, the trigger can be defined based on a processor load, a memory load, a number of connections, or a change in scale. For example, the trigger can be defined for before a determined scale-in or scale out or after a determined scale-in or scale out.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
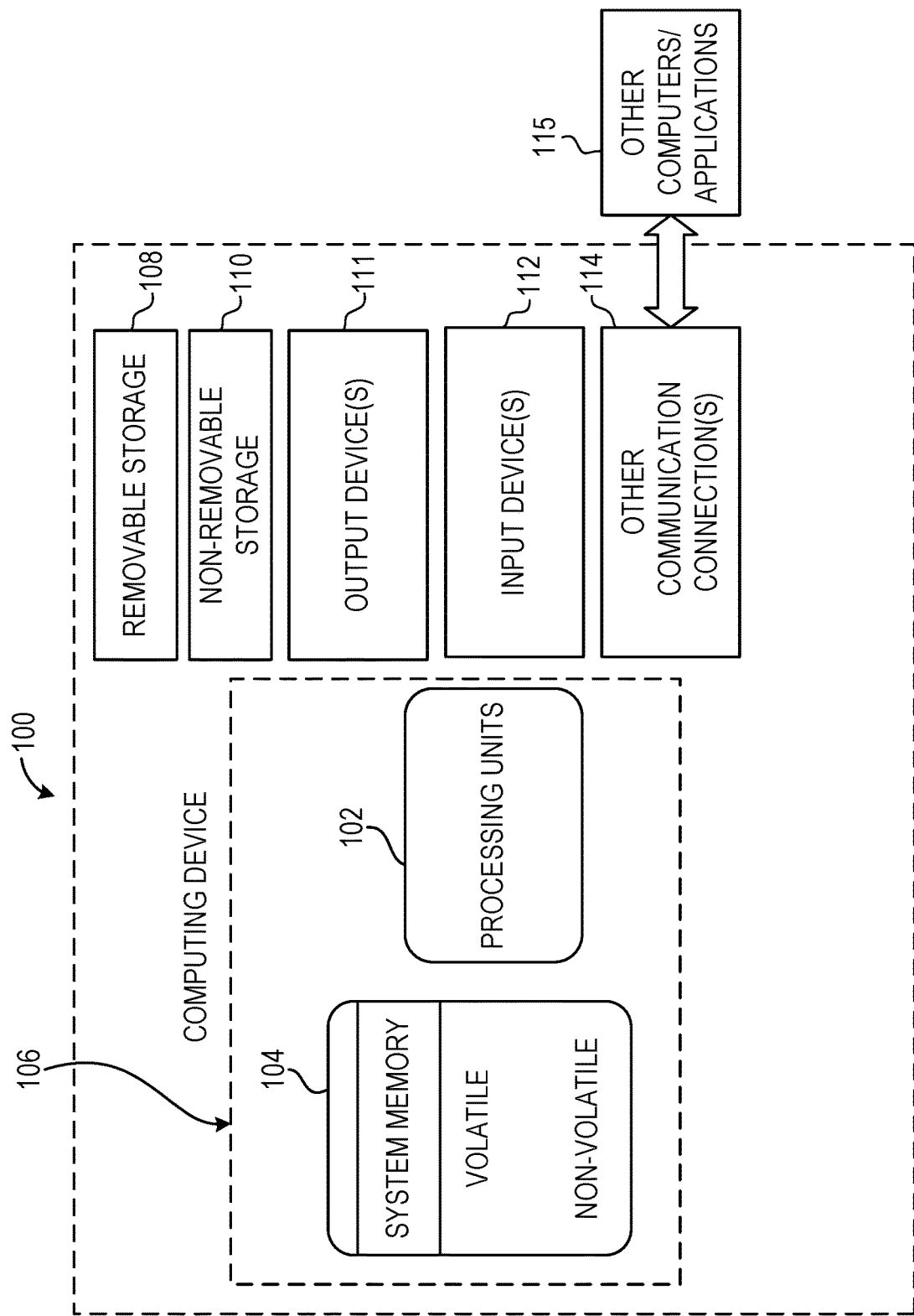
FIG. 1 is a block diagram illustrating an example of a computing device, which can be configured in a computer network that can provide a cloud computing system.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), nonvolatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the internet, or other network.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. A hybrid cloud is a deployment model that includes two or more clouds, such as private clouds, public clouds, and community clouds or combinations of two or more of each deployment model, that remain unique entities. Deployment models generally include similar cloud architectures, but may include specific features addressing specific considerations such as security in shared cloud models.

Cloud-computing providers generally offer services for the cloud-computing environment as a service model such as an infrastructure-as-a-service (IaaS), platform-as-a-service (PaaS), and other services including software-as-a-service (SaaS). Cloud-computing providers can provide services via a subscription to tenants or consumers. For example, software-as-a-service providers offer software applications as a subscription service that are generally accessible from web browsers or other thin-client interfaces, and consumers do not load the applications on the local computing devices. Infrastructure-as-a-service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform-as-a-service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
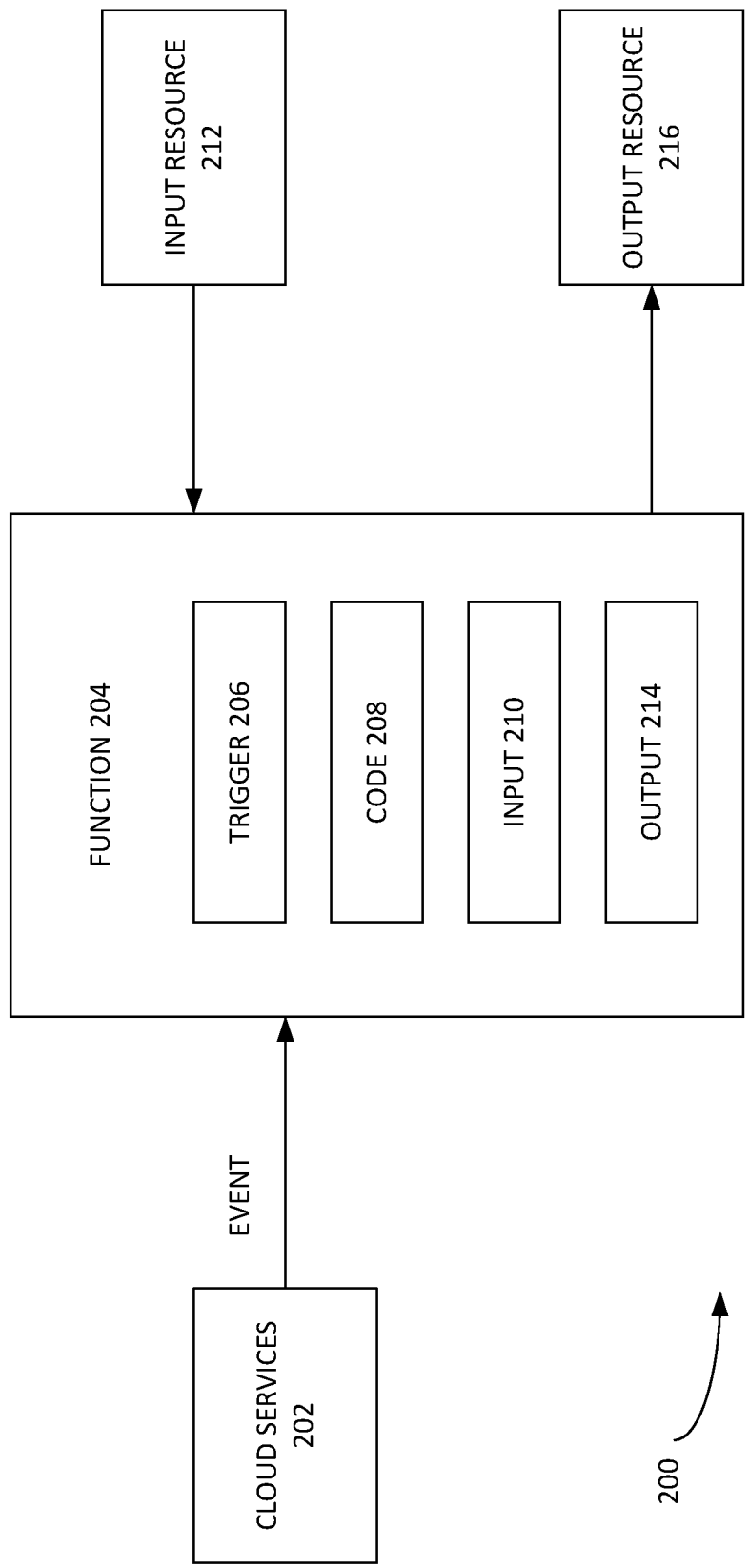
FIG. 2 is a schematic diagram illustrating an example cloud computing system.

FIG. 2 illustrates an example cloud computing system 200 in which a cloud computing service provider operates an execution environment and can run a computer server and allocates resources. In one example, cloud computing system 200 is an execution model that may be colloquially referred to as serverless computing, which can simplify the process of deploying a program into production. In cloud computing system 200, a cloud computing service provider may offer a compute runtime such as a function-as-a-service (FaaS), that can execute application logic but not store data. Capacity, scaling and maintenance can be hidden from the developer or tenant. In such an example, function as a service resemble platform as a service, but platform as a service typically have a server process running that receives external requests and scaling can be achieved by booting additional server processes that are charged to the developer. For example, scaling remains visible, even in autoscaling, in a platform as a service. In contrast, a function as a service typically does not include a constantly run server process. In one example, the cloud computing system 200 is an event driven serverless compute platform.

The cloud computing system includes cloud services 202 that can generate an event. The event is provided to a function 204 as a trigger 206. Function 204 can be configured as a computer application. In one example, a function 204 can be directed to handle a stateless, short-lived task, although a function could be configured as a durable, stateful task in some examples. Further, functions 204 may be chained together to create more comprehensive application program interfaces and microservices applications. The function 204 includes a trigger 206, which causes the function to run in the cloud computing service. For example, once an event occurs, defined in the function 204 as the trigger 206, a cloud computing service loads the function code 208 into a suitable execution environment, run the code 208 and release the compute resources in the cloud computer system 202. In the illustrated example, function 204 may receive an input 210 from an input resource 212 coupled to the function, and the function may generate an output 214 to an output resource 216.

In the example, the trigger 206 is based on a performance parameter of the cloud computing system 200. For example, the performance parameter can include a compute resource or processor use, an amount of memory used, an amount of connections to the cloud service, or a change in scale. For example, the trigger can be defined for before a determined scale-in or scale out or after an effected scale-in or scale out. In one example, the cloud services 202 can be connected to a monitoring service that can determine performance parameters. In one example, the monitoring service of cloud service 202 can collect metrics of the execution environment, the function 204 can include a trigger defined as a metric of the execution environment.

In one example, a cloud application on cloud computing system 200 provides for functionality prior to scaling in order for a new instance to work and synchronize with an existing instance. In this example, a function in the cloud computing system 200 keeps state in a database, and when a new instance of the function is created, the database is partitioned for efficient scaling. In a typical scenario, the cloud application begins the database partitioning at the time the new instance is created, which can stress performance of the cloud application. In the example of cloud computing system 200, however, a function, such as function 204, provides for preparation of scaling, such as database partitioning, based on performance parameter trigger 206, such as a performance parameter typical in the case of tasks or loads or connection numbers that can lead to creating a new instance. Once the performance parameter as defined in the function 204 is triggered, the function 204 can begin preparations for scaling out as defined in the function, and the preparations will be ready once a new instance is created. If, however, the cloud application is not scaled out and the function is run, the function 204 can be defined to remove the preparations after a time, or another function can be created that removes the preparation upon the performance parameter trigger.

In another example, a cloud application is reading data from a database, processing the data, and sending to an end user. In such a cloud application, the cloud application will use more cloud system infrastructure per task the larger the amount of data quantity is processed in each task, or the amount of data per page. On large data loads without provisions to scale, performance of the cloud application begins to suffer. A solution may be to lower the amount of data per page. The cloud service 200 can be provided with a function 204 to lower the data per page that is triggered based on a performance parameter indicative of the cloud application struggling.

In the two examples provided, separating the tasks to prepare for scaling and the tasks to lower pagination into a function 204 apart from the cloud application can preserve the focus of the cloud application, and performance of the cloud application will not be adversely affected with the additional tasks.

Figure 3:
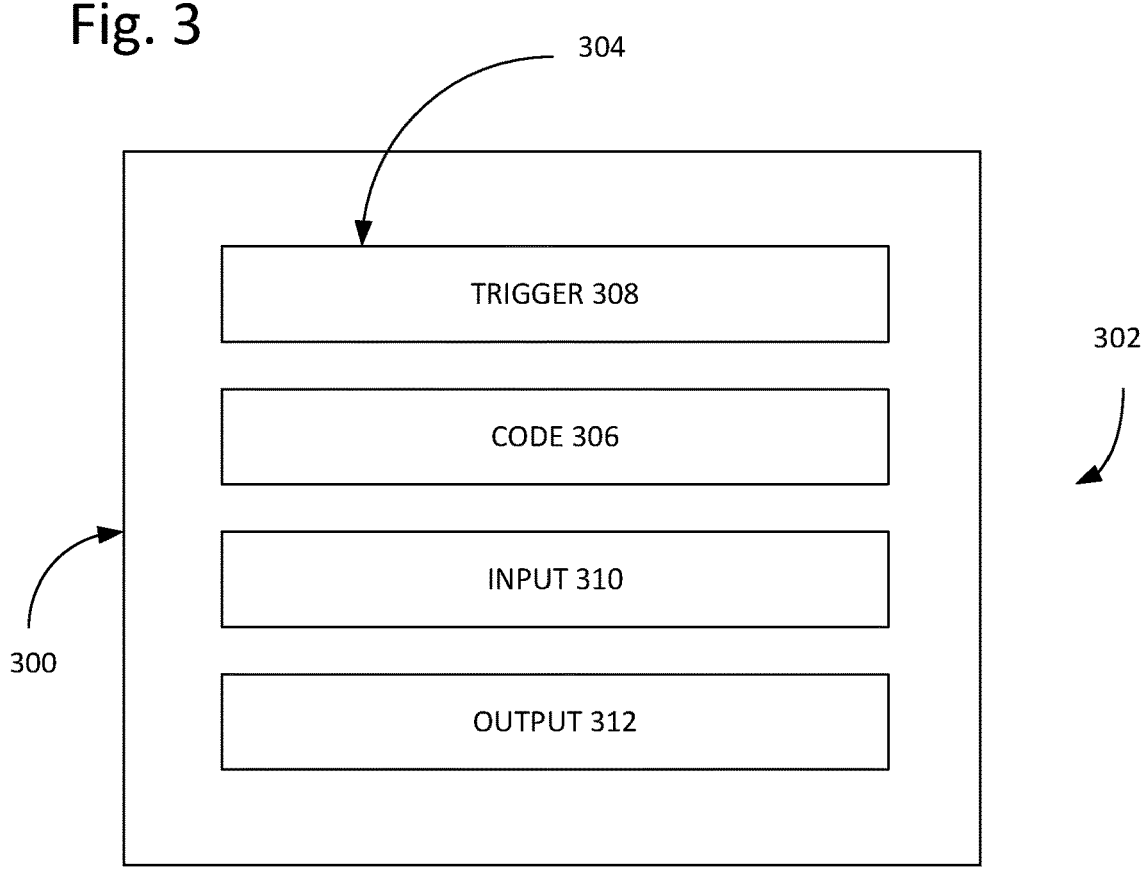
FIG. 3 is a schematic diagram illustrating an example cloud computing function of the cloud computing system of FIG. 2.

FIG. 3 illustrates an example template 300 of a function 302, such as function 204, with a trigger 304 that is based on a performance parameter of the cloud computing system, such as cloud computing system 200. In one example, the template 300 can be configured in an application platform in a cloud computing environment to deploy cloud applications across selected datacenters. In one example, the template 300 can be configured in a distributed application structure, for example a web application for running in a thin-client interface such as a browser, and provide access to a service subscription to deploy the cloud application in the cloud computing environment. In one example, the template 300 includes a code field 306 to receive a developer's code of the function 302 to be run in the cloud computing system in response to the performance parameter. The template 300 also include a trigger field 308 to receive a definition of the performance parameter trigger 304. In some example, the template 300 further includes an input field 310 to define an input resource to be used as an input to the function 302 and output field 312 to define an output resource to be provided with an output of the function 302. For instance, the function 302 set forth in code field 306 is triggered to run upon the performance parameter as defined in the trigger field 308. The function 302 receives an input from the input resource as defined in input field 310. Upon execution of the function 302, an output is provided with output resource as defined in the output field 312.

In one example, the source code provided to the code field 306 can be in one of several available computer languages, and the function 302 can be executed in a language-specific runtime. The function 302 execution environment can vary by the selected runtime. The source code of the function 302 loaded into code field 306 may be generated in the field, uploaded from a local system, or accessed via a source repository. The trigger field can include a menu of available performance parameter types such as processor load, memory load, connections, along with a definitions field to define the process parameter. The process parameter trigger determines how and when the function executes based on an infrastructure process parameter running the cloud application associated with the function 302. The cloud application can be built as a full stack serverless application with cloud service resources including compute, storage, database, and machine learning.

Figure 4:
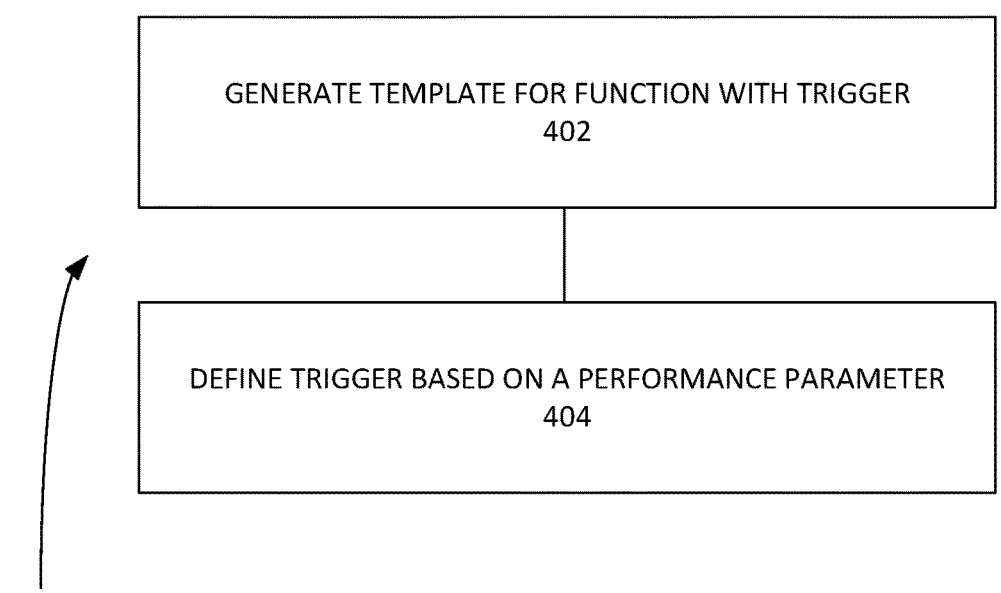
FIG. 4 is a block diagram illustrating an example method of the cloud computing system of FIG. 2.

FIG. 4 illustrates an example method 400 that can be used by the cloud computing system 200. A template for a function that can be deployed in the cloud computing system is generated at 402. In one example, the generated template, such as template 300 can include a code field 306, and a trigger field 308. The template can further include an input field 310 and an output field 312. A trigger for the function is defined at 404. The trigger is based upon a performance parameter of the cloud computing system. In one example, defining the trigger includes defining a performance parameter type and a performance parameter value. The performance parameter type can be selected from a plurality of performance parameter types related to the performance of the infrastructure of the cloud computing system running the cloud application. For example, performance parameter types can include processor load, memory load, and connections. Performance parameter values can include particular performance amounts for the performance parameter type and ranges of performance amounts for the performance parameter types.

The example system 200, template 300, and method 400 can be implemented to include a combination of one or more hardware devices and computer programs for controlling a system, such as a computing system having a processor 102 and memory 104, to perform method 400. For instance, system 200, template 300, and method 400 can be implemented as a computer readable medium or computer readable storage device having set of executable instructions for controlling the processor 102 to perform the method 400. The system 200, template 300, and method 400 can be included as a service in a cloud environment, and implemented on a computing device 100 in a datacenter.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for use with a cloud computing system, the method comprising:
    generating a template for a function in the cloud computing system, the function to be run in response to a trigger, the template includes a function field and a trigger field, the function in the function field; and
    defining the trigger for the function in the trigger field, the trigger based upon a performance parameter of the cloud computing system.

2. The method of claim 1 wherein the performance parameter is related to a cloud application associated with the function.

3. The method of claim 1 wherein the performance parameter includes one of a processor load, a memory load, and a number of connections.

4. The method of claim 1 wherein the function to be run in response to the trigger includes the function to be run in response to one trigger.

5. The method of claim 1 wherein the trigger field accepts a performance parameter type and a performance parameter value.

6. The method of claim 1 wherein the function field accepts a code of the function.

7. The method of claim 6 wherein the function field accepts the code of the function in a plurality of computer languages.

8. The method of claim 7 wherein the function is executed in a runtime environment corresponding with the computer language of the code.

9. The method of claim 1 further comprising a input field and an output field.

10. A computer readable storage device, which is not a transitory propagating signal, to store computer executable instructions to control a processor to:
    generate a template for a function in a cloud computing system, the template to accept a code to provide the function, the function to be run in response to a trigger; and
    define the trigger for the function in the template, the trigger based upon a performance parameter of the cloud computing system.

11. The computer readable storage device of claim 10 wherein the template is configured to receive a user defined function and a user defined trigger.

12. The computer readable storage device of claim 10 wherein the template includes a function field to receive a user defined function and a trigger field to receive a user defined trigger based on the performance parameter.

13. The computer readable storage device of claim 10 wherein performance parameter is selected from one of a processor load, a memory load, and a number of connections.

14. A system, comprising:
    a memory device to store a set of instructions; and
    a processor to execute the set of instructions to:
    generate a template to receive a code to provide a function in a cloud computing service, the function to be run in response to a trigger; and
    define the trigger for the function in the template, the trigger based upon a performance parameter of the cloud computing service.

15. The system of claim 14 wherein the cloud computing service is a serverless environment.

16. The system of claim 15 wherein the serverless environment is a function-as-a-service.

17. The system of claim 16 wherein the performance parameter is related to a cloud application associated with the function.

18. The system of claim 17 wherein the function to be run in response to the trigger includes the function to be run in response to one trigger.

19. The system of claim 18 wherein the performance parameter includes one of a processor load, a memory load, and a number of connections.

* * * * *